United States Patent [19]

Sakai et al.

[11] Patent Number: 5,329,330
[45] Date of Patent: Jul. 12, 1994

[54] FILM UNIT WITH A PHOTOGRAPHIC LENS

[75] Inventors: Zeniti Sakai; Kazuo Todo; Takao Tsuda; Hiroshi Kibayashi, all of Tokyo, Japan

[73] Assignee: Konica Corporation, Tokyo, Japan

[21] Appl. No.: 3,133

[22] Filed: Jan. 12, 1993

[30] Foreign Application Priority Data

Jan. 31, 1992 [JP] Japan .................. 4-16937

[51] Int. Cl.$^5$ ............................................. G03B 17/02
[52] U.S. Cl. ................................................ 354/288
[58] Field of Search ........................... 354/288, 149.11

[56] References Cited

U.S. PATENT DOCUMENTS

4,896,178  1/1990  Ohmura et al. ...................... 354/288
5,063,400 11/1991  Takei et al. .......................... 354/288
5,126,775  6/1992  Nakai et al. .......................... 354/288

*Primary Examiner*—David M. Gray
*Attorney, Agent, or Firm*—Frishauf, Holtz, Goodman & Woodward

[57] ABSTRACT

A photographic film is previously wound around a spool in a scroll chamber to be ready for photographing. The film is wound by one frame when a film winding knob is operated. After all the frames have been exposed, it is wound back to a film magazine in a film magazine chamber. The film magazine in which the film has been wound, is taken out from the film magazine chamber when a rear cover is folded at a groove portion provided on the rear cover after at least one of the three engaging hook portions between the rear cover and the film unit body has been disengaged.

7 Claims, 7 Drawing Sheets

FILM UNIT WITH A PHOTOGRAPHIC LENS

BACKGROUND OF THE INVENTION

The present invention relates to a film unit with a photographic lens having exposure and film winding functions, by which a photograph can be taken using an unexposed film previously loaded into the unit.

The film unit with photographic lens is a camera in which a film is integrally provided, which is sometimes referred to as a single use camera. As is well known, the camera is used only for the purpose of photographing the film loaded in the camera, and after exposure, the film is taken out from the camera and then the camera is disposed of. Therefore, the structure of the camera is simple, and the manufacturing cost is low.

Single use cameras are frequently purchased and used when travelling. However, single use cameras of the prior art are not convenient to be carried. For example, a single use camera is provided with a photographic lens, the focal distance of which is 35 mm, and the dimensions of which are 110 mm×60 mm×35 mm, so that it can not be put into a shirt pocket.

Recently, use of the single use camera has diversified, and there is a tendency that a strobe unit is installed in the camera so that the camera performance can be improved. For that reason, the cost is inevitably raised, and further the dimensions of the camera are inevitably increased.

Recently, it has been required to reclaim single use cameras from the viewpoint of recycling.

Before the camera bodies are reused, of course, it is necessary to check them so as to guarantee their quality. Therefore, it has been required to provide cameras that can be reused when very small number of parts are replaced.

That is, it has been required to provide reusable cameras having a means that can prevent the cameras from being reused without the check of their quality. Therefore, reusable cameras from the film magazines of which photographers can easily take out films cause a problem.

Of course, it is necessary to avoid an increase in cost even when the aforementioned means is adopted. Also, if necessary, the film must be easily taken out from the camera without lowering the reliability. Further, the processing for recycling the cameras must be simple and easy.

SUMMARY OF THE INVENTION

It is a primary object of the present invention to provide a film unit with a photographic lens that can be easily recycled, characterized in that: the increase in cost is reduced when the structure is simplified and the space is effectively utilized; the film magazine can be easily taken out from the camera in a laboratory; and the reliability is high.

The first embodiment of the film unit with a photographic lens of the present invention is structured in the following manner: A film is previously wound around a spool in a scroll chamber so that photographing can be immediately carried out. The film is wound by one frame when a film winding knob is operated. After all the film has been exposed, it is rewound from the to a film magazine in a film magazine
    chamber. The film magazine
        to in which the film has been wound, is taken out
            from the film magazine chamber when a rear cover
is bent at a groove portion provided on the rear cover after at least one of the three engaging portions between the rear cover and the film unit body has been disengaged, whereby the film magazine chamber side is open when the rear cover is bent.

The second embodiment of the film unit with a photographic lens of the present invention is structured in the same manner as the first embodiment, wherein each of the three engaging portions exists on each surface of at least three surfaces of the rear cover.

The third embodiment of the present invention is structured in the following manner: Four engaging portions are provided, wherein two of them are opposed to the other two so as to form two pairs of engaging portions provided, and the engaging direction of one pair is perpendicular to that of the other pair.

The fourth embodiment of the film unit with a photographic lens of the present invention is structured in the following manner:

The film unit is provided in a cardboard box, and when the cardboard box is removed from the film unit after the completion of exposure, a lock of the engaging portion is released.

The fifth embodiment of the film unit with a photographic lens of the present invention is structured in the following manner: The cardboard box covers the aforementioned thin groove portion provided for bending the rear cover.

The sixth embodiment of the film unit with a photographic lens of the present invention is structured in the following manner: The card board box covers at least two engaging portions.

BRIEF DESCRIPTION OF THE DRAWINGS

FIGS. 7(a) and 7(b) are views explaining a condition of locking between the rear cover and the hook engaging portion of the main body, wherein locking is conducted by the cardboard box.

DETAILED DESCRIPTION OF THE PREFERRED EMBODIMENTS

Figure 1:
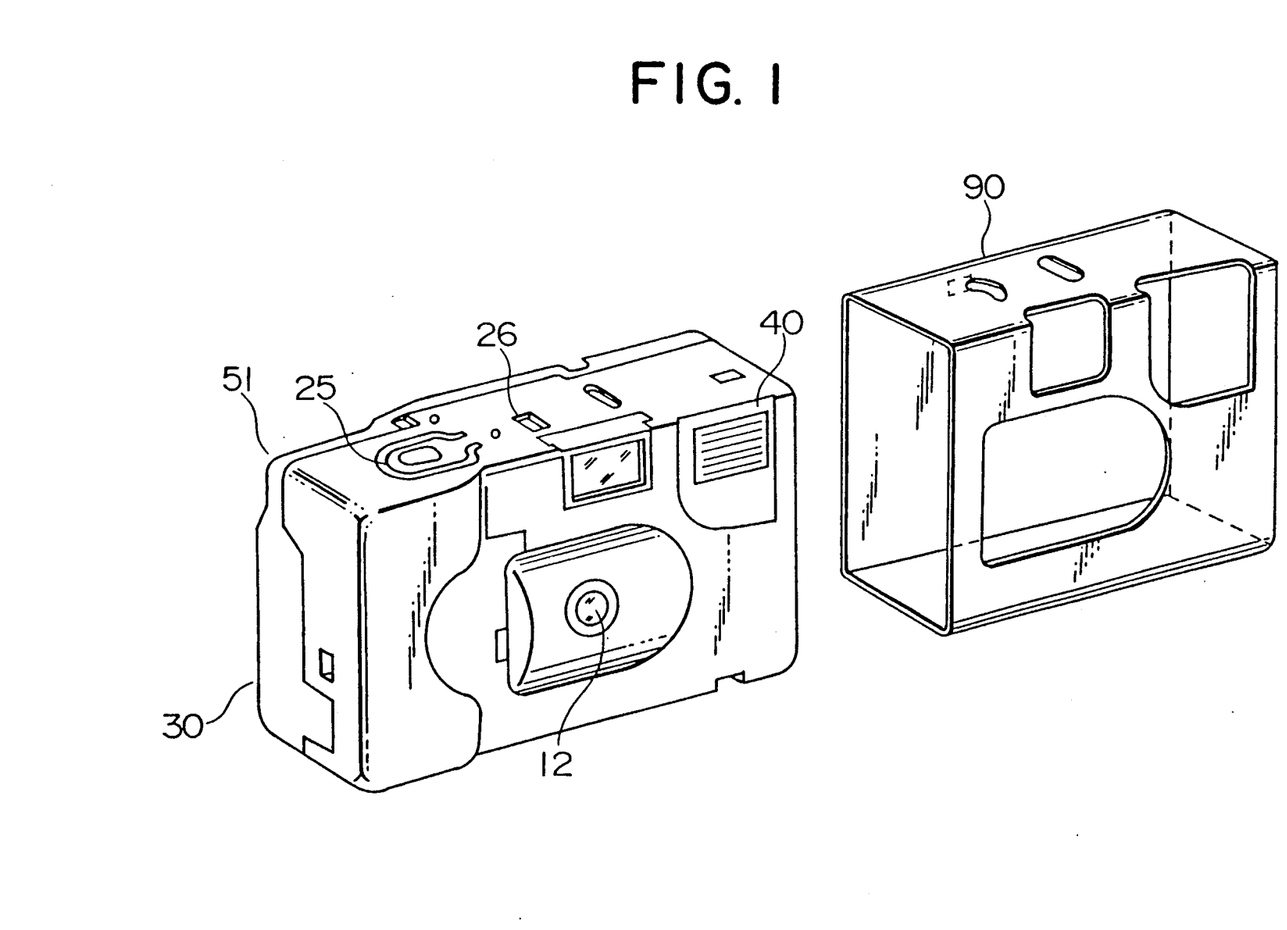
FIG. 1 is a perspective view showing the appearance of the film unit with a photographic lens of the present invention.

FIG. 1 is a view showing the appearance of a film unit with a photographic lens of the present invention. This film unit will be referred to as a camera in this specification, hereinafter. This camera is previously loaded with a 35 mm film roll (J 135) in the manufacturing process. After photographs have been taken, the film roll is not rewound, and the camera with the film is sent to the laboratory to develop and print the film.

An unexposed film used for this camera is loaded by the loading method described hereinabove. Assume that the film F is loaded into the camera so that the film F is wound around a spool S1 in film magazine P1. The film wound around the spool S1 int he film magazine P1 is wound to the space S2 in scroll chamber 15B. Thereafter, the film on space S2 is wound from the spool S2 to spool S1 of film magazine P1 each time a frame of the film F is exposed. The exposed film is thus wound into the film magazine. Thereafter, the exposed film which is in the film magazine P1 can be taken out form the camera in a bright room when the film is sent to a laboratory.

The exposed film provided in the film magazine can be easily taken out from the camera when a portion of the rear cover of the camera is curved. Consequently, when the rear cover is replaced with a new one and a new unexposed film is loaded, the camera can be reused.

The diameter of the aforementioned film magazine is different from that of a common film magazine (JIS K7528), and the outer diameter of the film magazine is 20.6 mm.

Therefore, the thickness of the camera can be reduced to about 24 mm, wherein the lens barrel portion is not included in the thickness. In this way, a very thin compact camera is realized.

A portion of the outer surface of the camera is covered with a carton 90 made of thick paper on which the brand name and the usage of the camera are printed.

Figure 2:
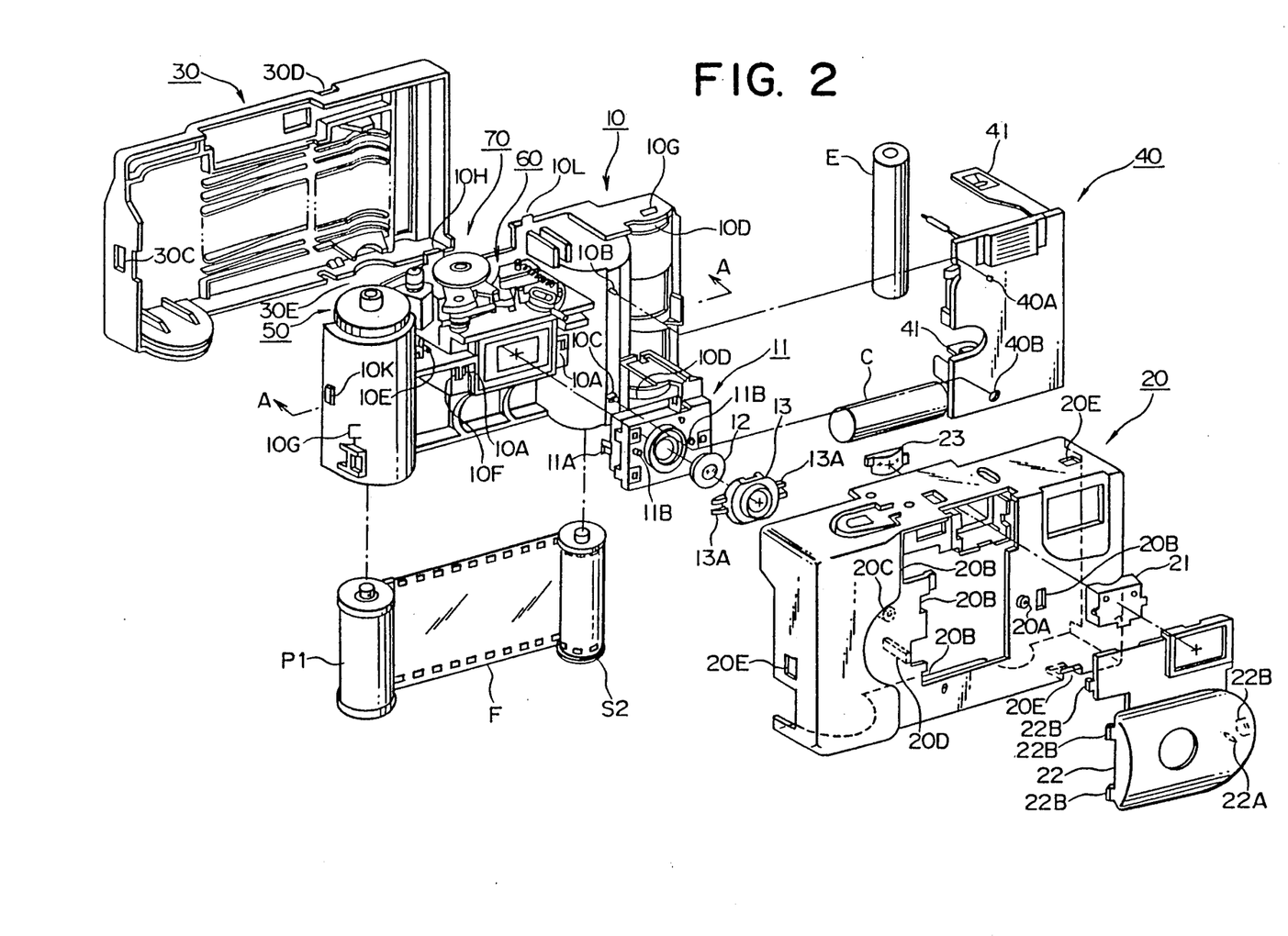
FIG. 2 is a development view showing the structure of the film unit with a photographic lens of the present invention.

FIG. 2 is a developed view showing the structure of the camera. (In this drawing, the engaging portion of the first example is shown.)

In FIG. 2, numeral 10 is a camera body, numeral 20 is a front cover, and numeral 30 is a rear cover. Numeral 40 is a strobe light unit installed in the camera, numeral 50 is a film winding mechanism, numeral 60 is a sector charge mechanism, and numeral 70 is a film counter mechanism.

The film winding mechanism 50, sector charge mechanism 60, and film counter mechanism 70 are assembled to the camera body 10, and further a shutter case accommodating the sector is assembled to the camera body 10.

The shutter case 11 is secured to the camera body 10 in such a manner that claws 11A protruded on both sides of the shutter case 11 are engaged with engaging portions 10A provided on the front of the camera body 10. Then, the sector is engaged with the sector charge mechanism 60.

Further, a single lens 12, the focal distance of which is f=30 mm and the diaphragm value of which is F9.5, is provided on the front of the shutter case 11. The single lens 12 is covered with a lens holder 13 having slots 13A engaged with guide pins 11B.

The camera body 10, shutter case 11, front cover 20, and rear cover 30 are made of black delustering plastic.

The strobe unit 40 is assembled to the camera body 10 so that holes 40A and 40B formed on the base plate are engaged with guide pins 10B and 10C provided on the front of the camera body 10.

Upper and lower battery holders 41 of the strobe unit 40 are inserted into upper and lower slits 10D of the camera body 10 so that the battery holders 41 are protruded into the battery chamber on the rear side of the camera body 10, and battery E, which is an electrical power source of the strobe unit, is held by the battery holders 41.

Condenser C integrally provided to the strobe unit 40 is accommodated in a condenser chamber formed in the lower portion of the shutter case 11.

When the front cover 20 is provided to the camera body 10, the assembly of the lens holder 13 and strobe unit 40 to the camera body 10 is completed.

Before the front cover 20 is provided to the camera body 10, an objective lens 21 of the viewfinder is set on the front of the front cover 20, and secured when a decoration cover 22 is engaged. A guide pin 22A is provided on the rear side of the decoration cover 22, and 4 claws 22B are protruded from the decoration cover 22. The guide pin 22A is engaged with a hole 20A formed on the front of the front cover 20, and the claws 22B are engaged with 4 engaging portions 20B.

An ocular eyepiece 23 of the viewfinder is set at the rear of the front cover 20, and then the front cover is assembled onto the front of the camera body 10.

A hole 20C, claw 20D, and 3 engaging portions 20E are provided on the rear side of the front cover 20. The hole 20C engages with a guide pin 10E on the front of the camera body 10, the claw 20D engages with a claw 10F, and the engaging portions 20E engage with engaging portions 10G provided on the side of the camera body 10.

When the front cover 20 is engaged with the camera body 10, the lens holder 13 and the strobe light unit 40 are secured to the camera body 10.

Film magazine P1 and spool S2 with which the tip of unexposed film F is engaged, are respectively provided in a film magazine chamber 15A and a scroll chamber (a film winding chamber) 15B that are formed at the rear of the camera body 10 to which the front cover has been assembled.

The other end of film F is engaged with spool S1 provided in film magazine P1. Even after the film in the film magazine has been wound around spool S2, the film can be rewound around spool S1 because the other end of the film is engaged with spool S1, so that the film can be returned into film magazine P1 after the photographing operation has been completed.

After film F has been loaded into the camera body, a rear cover 30 is provided at the rear of the camera body 10, so that the camera body 10 can be shielded and the film surface can be maintained at a predetermined focal position.

Claws 30A and 30B are provided on the front of the rear cover 30, and holes 30C and 30D are provided on the side of the rear cover 30. In the case where the rear cover 30 is assembled to the camera body 10, the claws 30A and 30B are engaged with the engaging portions 10H and 10J of the camera body 10, and the holes 30C and 30D are engaged with the claws 10K and 10L of the camera body 10.

After the rear cover 30 has been provided to the camera body 10, a predetermined film winding operation is carried out so that the film is ready for photographing, and then the carton 90 shown in FIG. 1 is provided around camera. In this way, the assembly is completed.

The assembly of the rear cover 30 to the camera body 10 will be explained in detail as follows.

Figure 5:
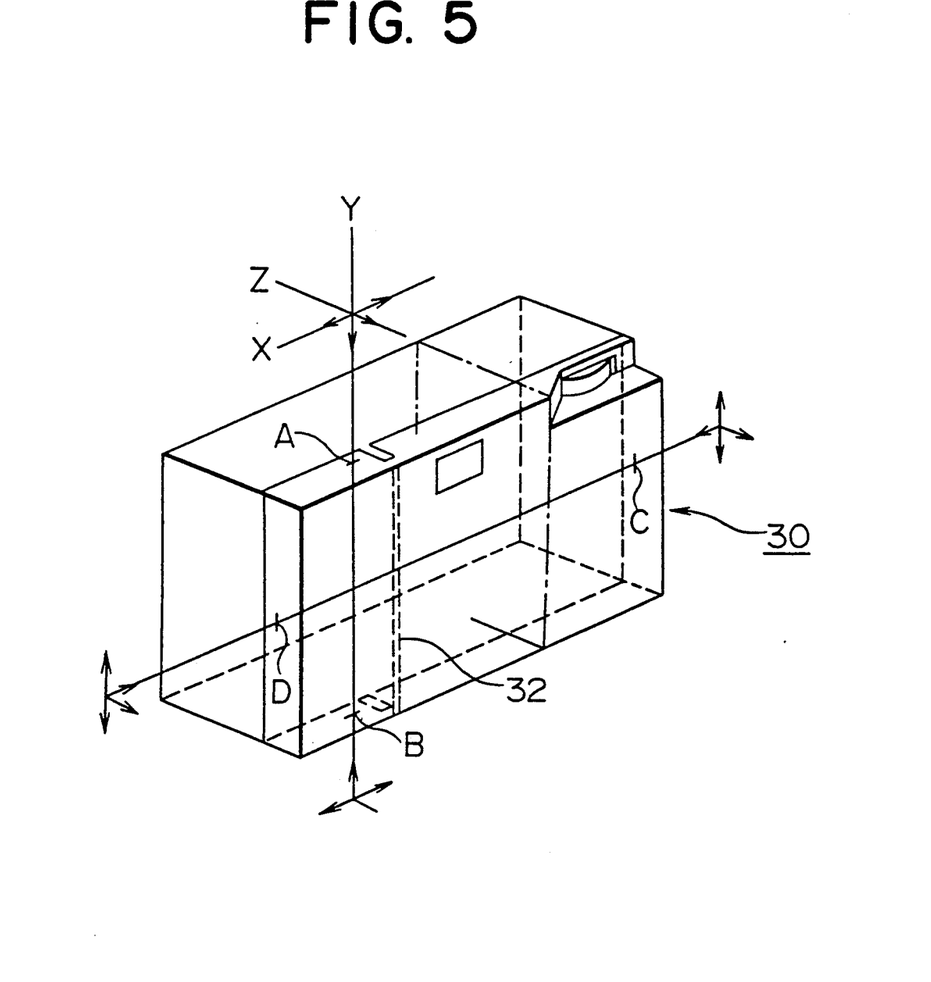
FIG. 5 is a perspective view of the rear cover and hook engaging portion of the film unit with a photographic lens of the present invention.

FIG. 5 is a perspective view in which the camera is viewed from the rear side. In order to clearly show the engagement between the rear cover and the camera, the primary portion is shown in this view (the second example).

In FIG. 5, characters A, B, C and D denote engaging portions by which the rear cover 30 is engaged with the camera body 10. These 4 engaging portions are of a hook type. Engaging portions A and B are provided in the upper and lower positions of the groove 32 along which the rear cover 30 is bent when the film magazine is taken out from the camera. Hook engaging portions A and B are opposed to each other so that they form a pair. The engaging directions shown by arrows X and Z are the same and the engaging direction shown by arrow Y is opposite with respect to hook engaging portions A and B.

Hook engaging portions C and D are located approximately in the center of the camera with respect to the traverse direction so as to engage the rear cover 30 with the camera body 10. Hook engaging portions C and D are opposed to each other so that they form a pair in the same manner as hook engaging portions A and B. The engaging directions shown by arrows Y and Z are the same and the engaging direction shown by arrow X is opposite with respect to hook engaging portions C and D.

As described above, hook engaging portions A and B form a pair, and hook engaging portions C and D also form a pair. The Y-direction of hook engaging portion A and that of hook engaging portion B are opposite to each other, and the X-direction of hook engaging portion C and that of hook engaging portion D are opposite to each other,. wherein straight line between hook engaging portions A and B, and that between hook engaging portions C and D make a right angle with each other. Although the Y-direction of hook engaging portion A and that of hook engaging portion B are opposite to each other, and further the X-direction of hook engaging portion C and that of hook engaging portion D are also opposite to each other, no problem is caused in the hook engaging action since the X-direction and the Y-direction make a right angle with each other. Since hook engaging portions A, B, C and D are disposed in the aforementioned positional relation, the rear cover 30 can be provided to the camera body 10 in a well-balanced manner. Only when hook engaging portion C is disengaged in the case where the film magazine is taken out from the camera, the rear cover 30 is bent along the groove 32. In this case, the rear cover 30 is engaged with the camera body by the hook engaging portions A, B and D that are located on the left side of the groove 32, so that it is easy to bent the rear cover 30 along the groove 32. While the rear cover 30 is bent, hook engaging portions A and B serves as a fulcrum.

Figure 6:
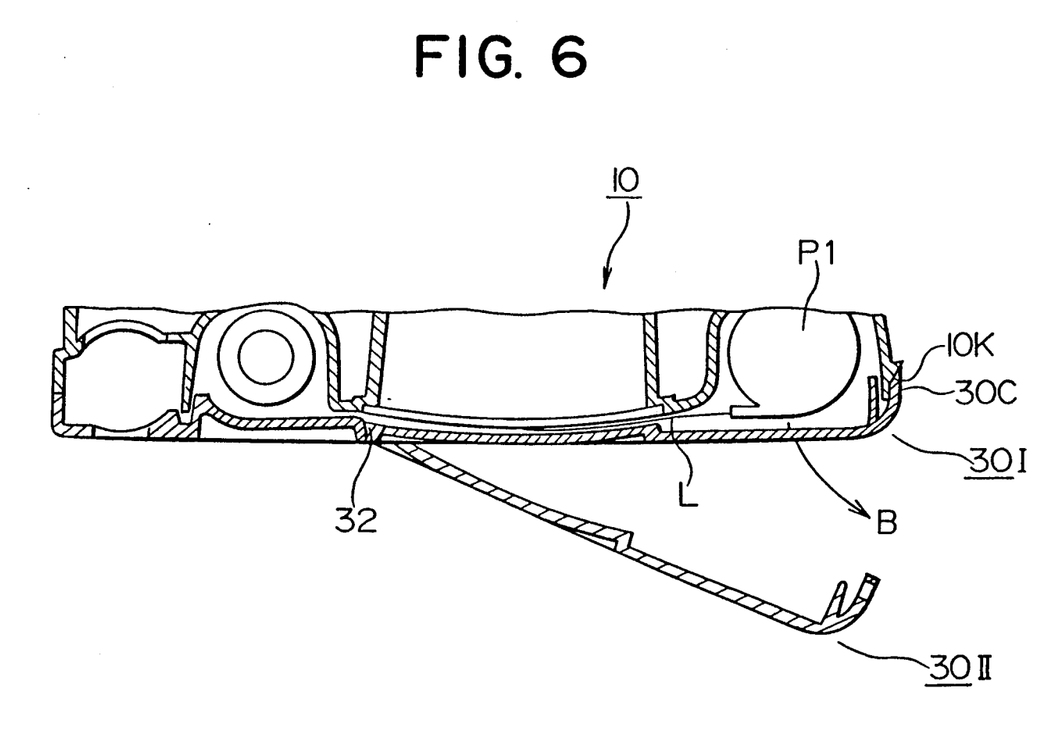
FIG. 6 is a schematic illustration showing a state in which a film magazine is taken out from the film unit with a photographic lens of the present invention.

FIG. 6 is a view showing a state in which a film is taken out from this camera. In FIG. 6, a hole 30C of the rear cover 30 is engaged with a claw 10K of the camera body 10. The engagement is released with a sharp tool when it is set into a gap formed between the claw and the engaging portion. Other engaging portions are maintained as they are, and then the rear cover 30 is bent along the groove 32 so that the rear cover 30 is opened from the state I to the state II. After that, film magazine P1, into which an exposed film is wound and leader L of the exposed film is disposed outside of the film magazine, is taken out from the camera body 10 in the direction indicated by arrow B.

As explained above, in the camera of the present invention, when one of the 4 hook engaging portions is disengaged and the rear cover is bent along the groove so that the rear cover is open, the film magazine can be easily taken out.

The film magazine is taken out from the camera in the aforementioned manner, and the camera provided with the opened rear cover is sent to the manufacturer. By the manufacturer, the rear cover is disconnected from the camera body, and the camera body is checked from the viewpoint of function and performance. After the check, a new unexposed film is provided into the camera, and a new film magazine is charged into the camera body, and then a new rear cover is provided to the camera. This camera, which is ready to be used, is sent to the market.

As described above, after the film magazine has been taken out from the camera in a laboratory, the camera is sent to the manufacturer under the condition that the rear cover is attached to the camera body. Consequently, in some cases, the rear cover is separated from the camera body when the film magazine is taken out, and in other case, the rear cover is attached to the camera body until the camera body returns to the manufacturer. The aforementioned circumstances are not desirable from the viewpoint of recycling. Therefore, it is necessary to provide a rear cover that is not separated from the camera body even when it is bent 4 or 5 times. For that reason, in the present invention, polystyrene was adopted to the rear cover, and the thickness of the groove portion of the rear cover was determined to be 0.6 mm. In this way, good results were obtained.

Figure 7A:
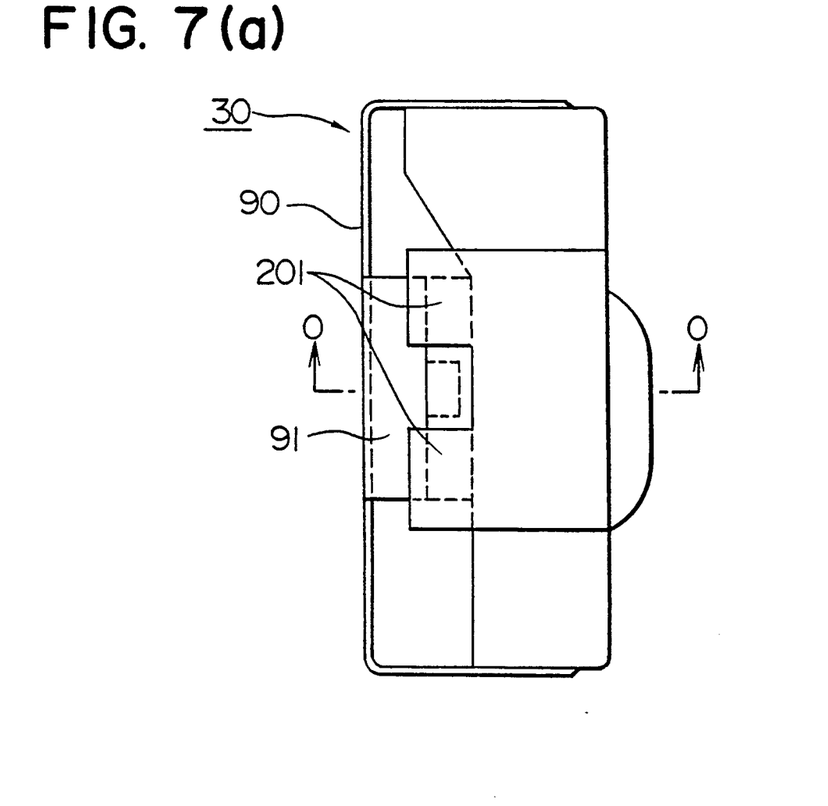
FIG. 7(a) is a side view taken from the right side of the camera.
Figure 7B:
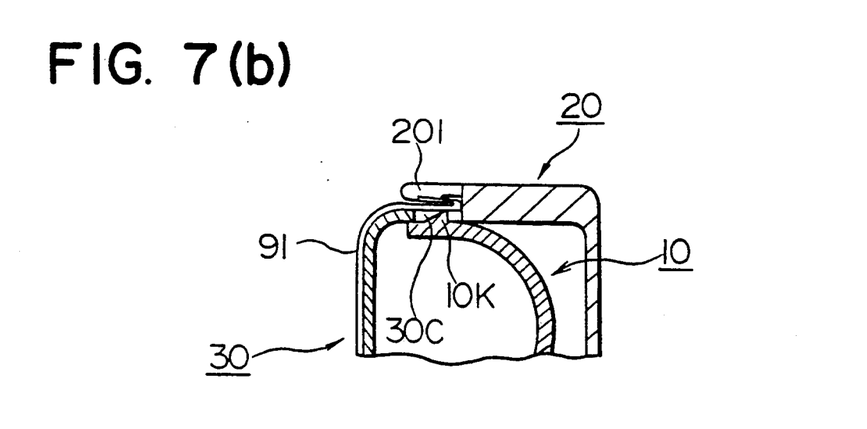
FIG. 7(b) is a sectional view taken on line 0—0 in FIG. 7(a).

FIGS. 7(a) and 7(b) are schematic illustrations showing the locking condition of the hook engaging portions provided between the rear cover and the main body. FIG. 7(a) is a side view taken from the right side of the camera, and FIG. 7(b) is a sectional view taken on line 0—0 in FIG. 7(a). The camera is covered with a cardboard box 90 on which the brand name and instruction are printed.

In FIGS. 7(a) and 7(b), the rear cover 30 is engaged with the camera body 10 in such a manner that the claw 10k of the camera body 10 is engaged with the hole 30C formed on the rear cover 30. The cardboard box 90 covers about ¾ on the left side of this camera. That is, the left portion from the one-dotted chain line in FIG. 5 is covered with the cardboard box 90. On the right side, lead 91, which is a portion of cardboard box 90, is extended, and engaged in such a manner that: the tip of lead 91 is folded and engaged with the lead engaging portion 201 provided on the front cover 20 as shown in FIG. 7(b) so that the cardboard box 90 covers a portion in which the rear cover 30 is hook-engaged with the camera body 10. Therefore, in order to disengage the rear cover 30 that is engaged with the camera body by the hole 30C formed on the rear cover and the claw 10K formed on the camera body 10, it is necessary to remove the cardboard box 90 from the camera body.

As described above, the cardboard box 90 covered about ¾ of this camera on the left side. Therefore, the cardboard box 90 covers the groove portion in which the rear cover is bent when the film magazine is taken out, and further covers the joint portion of the rear cover and the front cover or the camera body, so that a portion of the film that is located out of the film magazine can be protected and the light sealing property can be improved.

In this example, three engaging portions A, B and C are covered with this cardboard box in order to protect the engaging portions from being damaged.

The engaging portions may be disposed at the three positions (30C, 30D, 30E on the rear cover side, and 10K, 10L and 10M on the main body side). (the first example)

In this case, the portions opposed to the engaging portions 30D and 30E are disposed along the line of the groove on the scroll chamber side.

When the engaging portions are disposed on three surfaces (three directions), it is difficult for a photographer to open the rear cover, and it is necessary to open it with an exclusive tool. Therefore, the film in the camera can not be replaced arbitrarily by the photographer.

The film winding mechanism 50, sector charging mechanism 60 and film counter mechanism 70 are explained in detail as follows.

Figure 3:
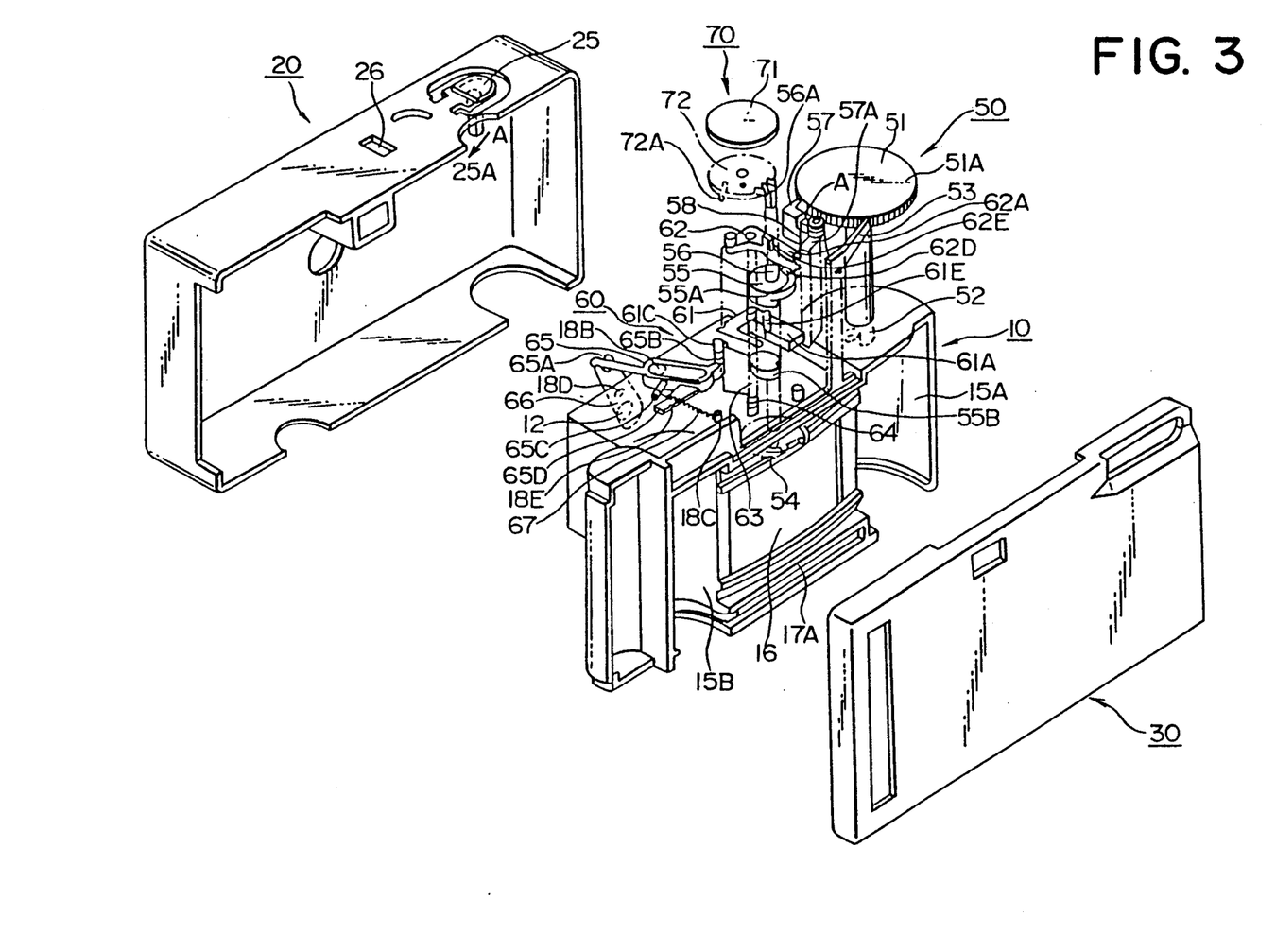
FIG. 3 is a perspective view of the film unit body and front cover of the film unit with a photographic lens of the present invention, wherein the film unit is viewed from the rear side.
Figure 4:
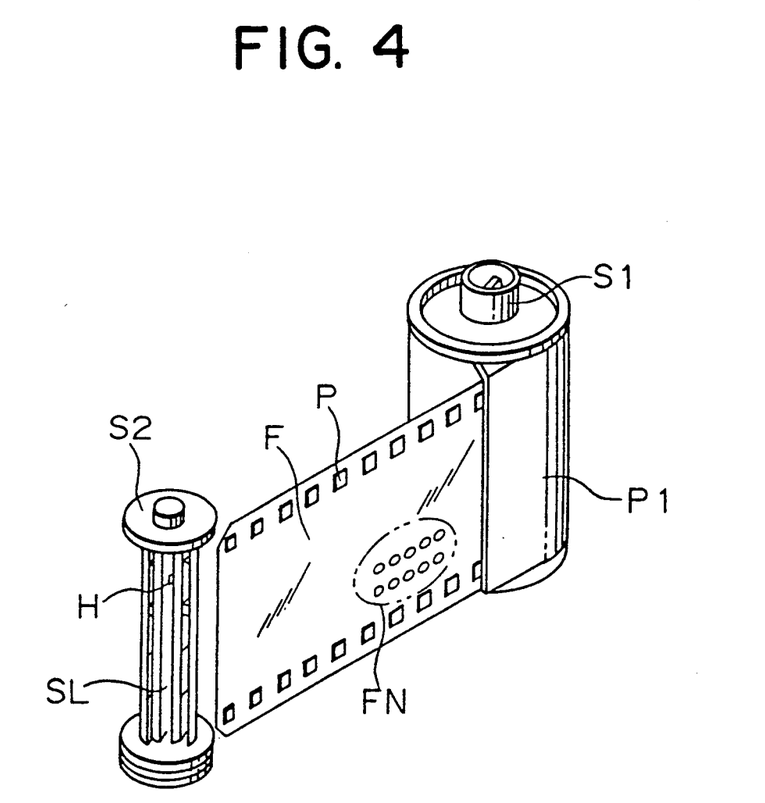
FIG. 4 is a perspective view of a film used for the film unit with a photographic lens of the present invention.

FIG. 3 is a perspective view showing the aforementioned mechanisms, wherein the view is taken from the rear side. FIG. 4 is a perspective view showing a film magazine and a spool around which a film is wound.

In the camera body 10, the film magazine chamber 15A for film winding use and the scroll chamber 15B for film loading use are formed on both sides of the image frame 16A that is an exposure section. J135 film F is loaded in film magazine P1 shown in FIG. 4.

Film F used for the camera of this example is provided in the same manner as a common film in the following manner: a roll film of J135 or a little thinner roll film of 130 to 140 μm thick is accommodated in a film magazine in a dark room, wherein one end of the film is secured to spool S1 of film magazine P1, and a predetermined length of film is wound around spool S1, and the other end of a predetermined length is disposed outside of film magazine P1. The aforementioned film is loaded into the camera as follows.

Film magazine P1 is provided in film magazine chamber 15A so that spool S1 of film magazine P1 can be engaged with a fork 52 for winding. On the other hand, spool S2 is inserted into the scroll chamber 15B. Then, film F is pulled out until the tip of film notch FN agrees with a mark 17A located in the lower portion of the lower rail surface. After that, the tip of film F is inserted into slit S of spool S2, and perforation P of film F is engaged with claw H. Incidentally, film notches FN of several holes formed on the film tip represent the lot number of an emulsion used for the film.

Next, the rear cover is set so that the camera body can be shielded. The camera in the aforementioned condition is set at a film winding apparatus, and film F is wound around spool S2 in the scroll chamber 15B so that the other end of film F is not separated from spool S1 of the film magazine P1. Since film F is provided in the camera in the aforementioned manner, film F is wound from film magazine P1 each time a frame of film F is exposed. After a predetermined number of frames have been exposed, 2 frames of film are wound without being exposed. In the aforementioned manner, all the exposed film is wound from film magazine P1, wherein a necessary length of film end is left outside of film magazine P1 without being wound around spool S1. Consequently, this film magazine can be taken out from the camera in a bright room.

Next, the mechanism of the camera body will be explained as follows.

The camera body 10 is provided with the essential mechanisms including the photographic lens 12, film winding mechanism 50, sector charge mechanism 60, and film counter mechanism 70.

First, the film winding mechanism and sector charge mechanism will be explained.

Numeral 51 is a film winding knob, and when the film winding knob 51 is rotated counterclockwise, film F can be wound. Perforations P of film F are engaged with a sprocket wheel 54, the number of teeth of which is 8. The sprocket wheel 54 and a cam 55 having a semicircular cam portion 55B, are mounted on the same shaft, and the cam 55 is rotated counterclockwise by one revolution when the film is wound.

That is, the film is wound by one frame, and the length of one frame is the same as that of 8 perforations, the same as that of teeth of the sprocket wheel. In this case, the dimensions of the frame are 24×36 mm.

As the cam 55 is rotated counterclockwise, the semicircular cam portion 55B is also rotated counterclockwise. In the aforementioned process, a charge lever 61 is rotated clockwise by the semicircular cam portion 55B, resisting the force of a charge lever spring 64 that pushes the charge lever 61 counterclockwise around a charge lever shaft 63. Therefore, a triangular push member 61C mounted on the charge lever 61 pushes a rising portion 65B of the sector lever 65, and then the triangular push member 61C gets over the rising portion 65B, so that the sector charge mechanism is charged as shown in the drawing.

A sector spring 67 is provided between a pin 65C of the sector lever 65 and a pin 18C mounted on the camera body 10. By the tensile force of the sector spring 67, a pin 18B that slidably guides a long hole of the sector lever 65 is contacted with the left end of the long hole. Therefore, an arm plate 65D mounted on the sector lever 65 comes into contact with a pin 18E mounted on the camera body 10. A sector drive pin 65A that drives a sector 66 rotatably provided to a sector pin 18D mounted on the camera body 10, is inserted into a fork portion of the sector 66.

As described later, a protrusion 62D of a cam stopper 62 is disengaged from a groove 55A of the cam 55. An arm portion 57A of a winding stopper 57 is moved from the position illustrated in the drawing and disengaged from the edge portion of an arm 61A of a charge lever 61 and also from the edge portion of an arm 62A of a cam stopper 62. Therefore, the arm portion 57A of the winding stopper 57 is brought into contact with the edge surface of the arm portion 61A by the force of a winding stopper spring 58 that pushes clockwise. When the film is wound, the cam 55 is rotated by one revolution, and the groove portion 55A of the cam 55 is returned to the initial position. Then, the protruded portion 62D of the cam stopper 62 is forced to jump into the groove portion 55A by the spring force that pushes the cam stopper 62 clockwise by a horizontal tip portion of the charge lever spring 64. Due to the aforementioned jumping motion, the arm portion 57A of the winding stopper 57 that has been engaged on the edge surface of the arm portion 62A of the cam stopper 62, is disengaged.

The outer circumferential cylindrical surface of the film winding knob 51 is formed into a ratchet wheel. When the aforementioned engagement is released, a V-shaped protrusion of the tip of the winding stopper 57 jumps into the tooth groove of the ratchet wheel 51A by the action of the force of the winding stopper spring 58. Therefore, the film winding knob 51 is prevented from being rotated counterclockwise. That is, when the film winding operation has been completed, the film winding knob 51 can not be rotated any more.

The camera body 10 is provided with a claw 53 to prevent reverse rotation that is made of resilient resin, and the claw 53 comes into pressure contact with the ratchet wheel 51A so that the film winding knob 51 is prevented from reverse rotation.

When a release button 25 provided on the front cover 20 is pressed, a pin 25A provided at the rear of the release button 25 is moved in the direction indicated by arrow A in the drawing. That is, when the front cover 20 is assembled to the camera body 10, the tip of the release pin 25A is moved in the direction indicated by arrow A shown on the winding knob 51, so that the winding stopper 57 is rotated counterclockwise, resisting the force of the winding stopper spring 58. Then, the edge of the arm 61A of the charge lever 61 is disengaged from the edge surface of the arm 57A of the winding stopper 57, and the charge lever 61 is rotated counterclockwise, in other words, the cam stopper 62 is rotated counterclockwise by the force of the charge lever spring 64.

When the charge lever 61 is rotated counterclockwise by the spring force of the charge lever 64 that is stronger than the sector spring 67, the push member 61C of the charge lever 61 pushes the raised portion 65B of the selector lever 65 and gets over the raised portion 65B. Accordingly, the selector lever 65 is rotated clockwise around the pin 18B provided in the long hole of the selector lever, resisting the tensile force of the selector spring 67. After that, the selector lever 65 is returned by the tensile force of the selector spring 67. Consequently, the sector drive pin 65A is closed after the sector 66 has been rotated around the sector pin 18D so as to expose the film.

The cam stopper 62 is rotated counterclockwise together with the charge lever 61 in the manner described before, and the protrusion 62D of the cam stopper 62 is disengaged from the groove portion 55A of the cam 55. Even after the operation for pressing the release button has been stopped, the arm 57A of the winding stopper 57 is pushed clockwise by the force of the winding stopper spring 58. However, the arm 57A is blocked by the edge surface of the arm 61A of the charge lever 61, and the V-shaped protrusion of the tip of the winding stopper 57 is not engaged with the ratchet wheel 51A of the winding knob 51. Therefore, the next film winding operation can be carried out.

Next, the film counter mechanism will be explained as follows.

Numeral 72 is an index gear that engages with a V-shaped groove 56A provided at the tip of the cam shaft 56 mounted on the cam 55 rotated integrally with the sprocket wheel 54. Each time the film is wound by one frame and the cam shaft 56 is rotated by one revolution, the index wheel 72 is rotated clockwise by one tooth.

An index plate 71 is printed on the upper surface of the index wheel 72, so that the number of frames exposed is displayed in a counter window 26 formed on the upper surface of the front cover 20.

A projection 72A is provided on the lower surface of the index wheel 72. When a film winding operation is carried out after a predetermined number of frames have been exposed, the projection 72A is inserted between the protrusion 61E of the charge lever 61 and the protrusion 62E of the cam stopper 62. When the projection 72A is inserted between both protrusions 61E and 62E, the film is wound by one frame. Therefore, even after the cam 55 has been rotated by one revolution and the sector charge has been completed, the aforementioned protrusions 61E and 62E are blocked by the projection 72A of the index wheel 72, so that the charge lever 61 can not be operated, and the protrusion 62D of the cam stopper 62 can not be engaged with the groove portion 55A of the cam 55. The arm 57A of the winding stopper 57 comes into contact with the edge surface of the arm 62A of the cam stopper 62 by the force of the winding stopper spring 58. Therefore, the V-shaped protrusion of the tip of the winding stopper 57 is not engaged with the ratchet wheel 51A, and the charge lever 61 can not be operated to open and close the sector, so that the film can not be exposed.

When a film winding operation corresponding to 2 frames is carried out in the manner described above in this example, the index wheel 72 is rotated by an angle corresponding to 2 teeth, so that the projection 72A of the index wheel 72 keeps holding the protrusions 61E, and the charge lever 61 is blocked. However, the projection 72A is disengaged from the protrusion 62E of the cam stopper 62. Accordingly, the protrusion 62D is engaged with the groove 55A of the cam 55, so that the engagement of the winding stopper 57 is released, and the winding knob 51 is engaged with the winding stopper 57. Therefore, it becomes impossible to wind the film. As described before, the charge lever 61 is blocked, so that the film can not be exposed. In the manner described above, the end of the film is prevented from being wound into the film magazine. In this way, a leader of necessary length can be maintained. Therefore, even when a film magazine of a small outside diameter is used for the purpose of reducing the camera dimensions, the film can be easily pulled out from the film magazine in the developing process.

According to the present invention, the camera mechanism can be simplified, and the increase in cost can be prevented when the space in the camera is effectively utilized. The film magazine can be easily taken out from the camera without deteriorating the reliability, and the camera body can be recycled.

What is claimed is:

1. A lens-fitted photographic film unit comprising:
    (a) a body having a scroll chamber including a first spool, a film magazine chamber including a film magazine having a second spool therein, and a film-winding knob;
    (b) a photographic lens provided in said body;
    (c) an unexposed roll of film in said film magazine, said roll of film being wound from said film magazine to said first spool in said scroll chamber for ready exposure, wherein each frame of said roll of film is sequentially wound on said second spool of said film magazine by use of said film-winding knob each time a frame is exposed; and
    (d) a rear cover for covering a rear side of said body, said rear cover having:
        first and second side edge portions; and top and bottom edge portions; and
        a groove provided at an intermediate portion between said first and second side edge portions, said groove being perpendicular to said top and bottom edge portions, and said groove enabling said rear cover to be folded at said groove to at least partially open said body to provide access to said magazine; and
        wherein said rear cover has at least three releasable hook portions which releasably engage said rear cover with different sides of said body, and wherein, when at least one of said hook portions is released, after all frames of said roll of film have been exposed and said roll of film is wound on said second spool of said film magazine, said roll of film in said magazine can be taken out of said film magazine chamber by folding said rear cover at said groove.

2. The lens-fitted photographic film unit of claim 1, wherein each of said at least three hook portions is provided on a respective different surface of at least three surfaces of said rear cover.

3. The lens-fitted photographic film unit of claim 1, wherein:
   said rear cover comprises four hook portions which are positioned to form two pairs of hook portions so that the hook portions forming each pair are positioned to oppose each other;
   an engaging direction of a first one of said pairs of hook portions is perpendicular to an engaging direction of the other one of said pairs; and
   each of said at least four hook portions respectively engages a different wall portion of said body.

4. The lens-fitted photographic film unit of claim 1, further comprising a cardboard box for covering a part of said body, wherein when said cardboard box is removed from said film unit after a completion of exposure, a locking portion of at least one of said at least three hook portions is releasable such that said rear cover is bendable at said groove.

5. The lens-fitted photographic film unit of claim 4, wherein said cardboard box covers said groove portion.

6. The lens-fitted photographic film unit of claim 4, wherein said cardboard box covers at least two hook portions.

7. The lens-fitted photographic film unit of claim 1, wherein the intermediate position of the groove is provided at a position of said rear cover such that when said rear cover is bent at said groove, said rear cover has a larger portion and a smaller portion.

* * * * *